(12) United States Patent
Wood et al.

(10) Patent No.: US 7,638,179 B2
(45) Date of Patent: Dec. 29, 2009

(54) SEALING ELEMENT FOR VESSEL OR CONTAINER CLOSURES HAVING IMPROVED BARRIER PROPERTIES

(75) Inventors: Will Wood, Arden Hills, MN (US); Neil Beaverson, Vadnais Heights, MN (US)

(73) Assignee: Cellresin Technologies, LLC, St. Paul, MN (US)

( * ) Notice: Subject to any disclaimer, the term of this patent is extended or adjusted under 35 U.S.C. 154(b) by 0 days.

(21) Appl. No.: 10/139,140

(22) Filed: May 3, 2002

(65) Prior Publication Data

US 2002/0192413 A1 Dec. 19, 2002

Related U.S. Application Data

(60) Provisional application No. 60/288,839, filed on May 5, 2001.

(51) Int. Cl.
*B65D 41/00* (2006.01)
*B65D 53/00* (2006.01)

(52) U.S. Cl. ............ 428/35.7; 428/34.1; 428/36.4; 428/36.6; 428/36.7; 428/36.8; 428/36.92; 215/200; 215/328; 215/341

(58) Field of Classification Search ............ 428/34.1, 428/35.7, 36.6, 36.7, 36.92, 36.4, 36.8; 215/200, 215/228, 232, 233, 272, 276, 277, 316, 328, 215/341, 346, 349, 350, 352; 524/48; 426/133
See application file for complete search history.

(56) References Cited

U.S. PATENT DOCUMENTS

| | | | | |
|---|---|---|---|---|
| 3,565,887 A | * | 2/1971 | Parmerter et al. | ........... 536/103 |
| 5,177,129 A | * | 1/1993 | Bobo, Jr. | ................. 524/48 |
| 5,352,717 A | | 10/1994 | Bergishagen | .............. 524/48 |
| 5,381,914 A | | 1/1995 | Koyama et al. | |
| 5,492,947 A | | 2/1996 | Wood et al. | |
| 5,542,557 A | | 8/1996 | Koyama et al. | |
| 5,731,053 A | | 3/1998 | Kuhn et al. | ............. 428/369.2 |
| 5,985,772 A | * | 11/1999 | Wood et al. | .................. 442/70 |

FOREIGN PATENT DOCUMENTS

| | | |
|---|---|---|
| CN | 1154127 | 7/1997 |
| EP | 0 599 256 | 6/1994 |
| JP | 63212548 | 9/1988 |
| JP | 3033131 | 2/1991 |
| JP | 3215031 | 9/1991 |
| JP | 10151710 | 6/1998 |
| JP | 10-259276 A | 9/1998 |
| JP | 11-315213 A | 11/1999 |
| WO | WO 97/33044 | 9/1997 |
| WO | WO 01/30412 A1 | 5/2001 |

* cited by examiner

*Primary Examiner*—Rena L Dye
*Assistant Examiner*—Walter B Aughenbaugh
(74) *Attorney, Agent, or Firm*—Crompton, Seager & Tufte, LLC (57) ABSTRACT

Described is a closure element for a container. The closure elements has a sealing element which contains a thermoplastic polymer, and an effective absorbing amount of an unmodified cyclodextrin material. The unmodified cyclodextrin material may be an α-cyclodextrin, β-cyclodextrin, γ-cyclodextrin, and mixtures thereof. The sealing element can act as a barrier with respect to permeants, such as aromatic substances, trichloroanisole, aldehydes or ketones and/or impurities from the polymer.

13 Claims, 3 Drawing Sheets

Organic Vapor Permeation across a Crown Sealing Element.

Figure 1. Organic Vapor Permeation across a Crown Sealing Element.

Figure 2. Organic Vapor Closed-Volume Static Permeation Cell.

Figure 3. Closed-Volume Static Permeation Profile Illustration.

US 7,638,179 B2

SEALING ELEMENT FOR VESSEL OR CONTAINER CLOSURES HAVING IMPROVED BARRIER PROPERTIES

This application claims the benefit of U.S. provisional application Ser. No. 60/288,839, filed May 5, 2001.

FIELD OF THE INVENTION

The invention relates to closures for containers, especially bottles, comprising a sealing element or closure liner having improved barrier properties. The invention especially relates to sealing elements or closure liners for beverage containers comprising thermoplastic polymer compounds.

BACKGROUND OF THE INVENTION

Closures made of metal or plastics are used to seal e.g. bottles containing mineral water, juices, carbonated soft drinks and water, beer and other liquid products. The sealing closures, such as a twist crown, a crown cork or a screw cap, for bottles, jars and the like, commonly have an elastic sealing element on their inside facing the container mouth, which sealing element is pressed or clamped between the closure and the container when the closure is fitted and ensures tightness.

While formerly the liners of crown corks or bottle screw closures were predominantly made of press cork which was, if appropriate, also coated with a thin plastics film or thin aluminium foil, today sealing elements are commonly produced completely from synthetic polymer compounds. The sealing element of closures such as crown corks, screw caps and screw lids, which are usually made of metal (such as aluminium) or plastics (such as polyolefine material), often takes the form of a liner adhered to, or placed loose in, the closure.

Such sealing elements or closure liners must meet several requirements, as e.g. good sealing properties, low closing and opening torques in the case of screw-on closures and good adhesion to the cap material to ensure good retention of gases such as carbon dioxide and closure integrity. Moreover, the closures should have a valve or venting effect in case of any excess pressures arising in the container, in particular in beer, lemonade or mineral water bottles, and said venting effect should reliably occur at certain internal pressures. It is also important that the sealing elements or liners are capable of withstanding headloads as encountered in packaging, storage and handling of e.g. filled bottles, without damage to the liner.

One of the most important demands on sealing elements or liners is in the barrier properties of the sealing elements or liners. Ideally, the sealing elements or liners should prevent any substances which would affect aroma or taste, from entering the container or bottle. Moreover, it is clear that the liner material should have no flavor of its own which it can impart to the contents of the container. Changes of the taste of the container's contents are mainly due to oxidative aroma changes after the entry of oxygen, and changes of taste caused by the entry of organic flavor-affecting compounds. The general class of compounds contributing to undesirable off-taste comprise in particular aromatic substances such as benzenes or also phenyl ethers, for instance chloroanisoles. The latter are e.g. contained in wood pallets and cardboard boxes used for the transport or storage of beverage containers.

Furthermore, the closures or the barrier properties of the sealing elements or liners should also prevent the migration of flavors or volatile flavoring substances from the inside of the container or the bottle. The escape of the volatile flavoring substances e.g. during storage of the filled containers causes a flat taste of the beverage, which is of course very undesirable.

Beverage manufacturers have long searched for improved barrier materials. The sealing elements or liner materials known in the art, having at least some barrier properties, typically comprise polyvinylchloride, polyethylene or mixtures of these substances with vinylacetate or vinylacetate-ethylene copolymers. Although the use of PVC or other halogen-containing plastics leads to difficulties in the disposal and neutralization of the used container, PVC is still used in practice. It is also known in the art to use oxygen-bonding substances (oxygen scavengers) for improving the barrier properties of closures. These substances are reducing agents, intended to react with oxygen in the sealing element so that the oxygen does not reach the container contents. However, oxygen scavengers often do not have perfect sensory properties and they lose their effect with time.

An important improvement in the barrier properties of container closures is disclosed in U.S. Pat. No. 5,731,053. According to U.S. Pat. No. 5,731,053 the barrier properties of container closures can be improved by using a sealing element or liner, which is formed by placing and in-shell or out-shell molding, a molten piece of a polymer liner compound in the closure, wherein the molded sealing element or liner comprises a heterogeneous blend of butyl rubber and thermoplastic polymer. In the blend, the thermoplastic polymer, which preferably is HDPE, forms a continuous phase in the solid molded state, wherein the butyl rubber is contained in discrete separate phases or areas. In other words, the polymer liner compound according to U.S. Pat. No. 5,731,053 provides a pseudolaminate structure, with areas or layers enriched in butyl rubber adjoining or even alternating with areas or layers enriched in thermoplastic polymer, said layers being discrete enough to form an overall heterogeneous structure, and generally a structure with two separate solid phases.

In WO 97/33044 the use of cyclodextrin in rigid or semi-rigid cellulosic sheets is disclosed. The cyclodextrin acts as a barrier or a trap for contaminants. The barrier properties of the material disclosed in WO 97/33044 are based on entrapment of the respective permeants in the internal hydrophobic space of the cyclodextrin molecule. The cyclodextrin material is generally used in the form of a compatible, derivatized cyclodextrin. According to WO 97/33044 the preferred cyclodextrin is a derivatized cyclodextrin having at least one substituent group bonded to the cyclodextrin molecule.

SUMMARY OF THE INVENTION

Surprisingly, it has been found in the present invention that the incorporation of cyclodextrin materials, preferably compatible derivatized cyclodextrin materials into polymer liner compounds or sealing elements leads to closure elements or sealing gaskets having improved barrier properties.

According to the present invention a closure element comprising a sealing element or polymer liner compound having improved barrier properties is provided, the sealing element or compound comprising
  (a) a thermoplastic polymer; and
  (b) an effective absorbing amount of a cyclodextrin material; wherein the cyclodextrin material is selected from the group comprising α-cyclodextrin, β-cyclodextrin, γ-cyclodextrin, derivatives of α-cyclodextrin, β-cyclodextrin and γ-cyclodextrin and mixtures thereof.

According to the present invention it is preferred, that the cyclodextrin material is dispersed in the thermoplastic polymer. It is especially preferred that the cyclodextrin material has pendant moieties or substituents that render the cyclodextrin more compatible with the thermoplastic polymer.

Preferably, the amount of cyclodextrin material in the sealing element is in the range from 0.01 to 5 wt-%, preferably from 0.1 to 1 wt-%, based on the thermoplastic polymer in the sealing element.

DETAILED DESCRIPTION OF THE INVENTION

According to one preferred embodiment of the present invention the thermoplastic polymer comprises a polyolefine, preferably a polyethylene and more preferably high density polyethylene (HDPE). The cyclodextrin material having pendant moieties or substituents that render the cyclodextrin more compatible with the thermoplastic polymer preferably contains substituents having a silyl ether group, an alkyl ether group and/or an alkyl ester group. Suitable alkyl ester substituents comprise acetyl moieties, propyl moieties and/or butyl moieties. Preferred alkyl ether or silyl ether substituents comprise methyl moieties, ethyl moieties, propyl moieties and/or butyl moieties. It has been found that it is especially advantageous to incorporate γ-cyclodextrin having acetyl moieties and preferably a γ-cyclodextrin having three acetyl-groups per cyclodextrin unit into the sealing element. However, also the corresponding β-cyclodextrins having acetyl moieties sow excellent barrier or retention properties.

Furthermore, it has been found that the incorporation of cyclodextrin into polymer liner compounds or sealing elements comprising a heterogeneous blend of a rubber component, preferably butyl rubber and a thermoplastic polymer, especially HDPE, leads to closure elements or sealing gaskets having improved barrier properties. Preferred sealing elements comprising a heterogeneous blend of butyl rubber and HDPE as well as methods for manufacturing the corresponding closure elements are disclosed in U.S. Pat. No. 5,731,053.

In this context, it has been found, that it is generally advantageous if the cyclodextrin is dispersed in the continuous thermoplastic polymer phase, which preferably is a HDPE phase, which in the solid molded state further embeds or otherwise encloses the butyl rubber enriched areas or layers. Alternatively, the cyclodextrin material is contained in the aforementioned butyl rubber phase. While a polymer liner compound comprising a heterogeneous blend of thermoplastic polymer and butyl rubber having the cyclodextrin dispersed in the thermoplastic polymer often shows excellent barrier properties, the incorporation of the cyclodextrin material into the butyl rubber phase sometimes shows much less effect with respect to the barrier properties of the liner or sealing element. Incorporation of the cyclodextrin in the butyl rubber is therefore generally less preferred.

It is also preferred, according to one embodiment of the present invention, to provide the cyclodextrin-containing polymer liner compound with one or more additional layers comprising a thermoplastic polymer and an effective absorbing amount of a cyclodextrin material, preferably of a compatible derivatized cyclodextrin material, dispersed in the thermoplastic polymer.

Said additional layer is preferably arranged on the inner side of the closure element being in contact with the contents of the container closed with said closure element.

According to one preferred embodiment, the diameter of the additional liner layer is smaller than the diameter of the polymer liner compound comprising e.g. the heterogeneous blend, so that the additional layer material fits into the aperture of the mouth of a bottle and does not extend to the area clamped between the vessel mouth and the closure, so that it is not exposed to headloads.

According to a further embodiment the sealing element or liner according to the present invention can have a laminated structure e.g. comprising at least one layer containing a thermoplastic polymer and an effective absorbing amount of a cyclodextrin material and/or can be coated with a thermoplastic polymer and an effective absorbing amount of a cyclodextrin material, preferably of a compatible derivatized cyclodextrin material, dispersed in the thermoplastic polymer.

The sealing element or polymer liner compound of the present invention meets the requirements to sealing elements or closures as mentioned above and additionally provides improved barrier resistance to permeants, such as aromatic substances, especially trichloroanisole, aldehydes or ketones and/or impurities from the polymer. Moreover, the ingress of oxygen is reduced or prevented by adding cyclodextrin, especially compatible derivatized cyclodextrin, to the thermoplastic polymer e.g. of the heterogeneous blend of the liner. The sealing element or liner compound according to the present invention also prevents or dramatically reduces the loss of flavors or volatile flavoring substances from the inside of the container or the bottle through the cap.

The preferred cyclodextrin derivative is selected, based on the functional group compatibility with the polymer, the thermal stability of the cyclodextrin material and the cyclodextrin's ability to form an inclusion complex with volatile substances. The cyclodextrin derivative can contain one substituent on the single primary carbon hydroxyl and/or one substituent on one or both of the secondary carbon hydroxyls.

Cyclodextrin is commonly produced by a highly selective enzymatic synthesis. It generally consists of six, seven, or eight glucose monomers arranged in a donut shaped ring, which are denoted alpha-, beta-, or gamma-cyclodextrin, respectively. The specific coupling of the glucose monomers gives the cyclodextrin a rigid, truncated conical molecular structure with a hollow interior of a specific volume. This internal cavity is a key structural feature of the cyclodextrin, providing the ability to complex molecules (e.g., aromatics, alcohols, halides and hydrogen halides, carboxylic acids and their esters, etc.). The complexed molecule must satisfy the size criterion of fitting at least partially into the cyclodextrin internal cavity, resulting in an inclusion complex.

According to the present invention the cyclodextrin material is selected from α-cyclodextrin, β-cyclodextrin, γ-cyclodextrin, derivatives of α-cyclodextrin, β-cyclodextrin and γ-cyclodextrin and mixtures thereof. Also, according to the present invention a preferred cyclodextrin derivative inter alia is selected based on the functional group compatibility with the polymer on one hand and the cyclodextrin's ability to form an inclusion complex with targeted substances on the other hand.

According to the present invention it is preferred that the cyclodextrin material is compatible with the liner material. According to the present invention, "compatible" means that preferably the cyclodextrin material can be uniformly dispersed into the melt polymer, can retain the ability to trap or complex permeant materials or polymer impurity, and can reside in the polymer without substantial reductions in barrier properties.

Moreover, the cyclodextrin's internal cavity size (i.e., $\alpha$, $\beta$, $\gamma$) must be considered and the derivative functional group modification must be suitable for forming an inclusion complex with targeted volatiles or impurities. To achieve a specific result, more than one cavity size and functional group may be necessary. For example, blends of $\alpha$ and/or $\beta$ that contain $\gamma$-cyclodextrin have greater complexation efficiencies for some volatile substances than without $\gamma$-cyclodextrin. Computational modelling has shown that the type and number of functional groups on the ring provide different complexation energies for specific ligands (i.e., complexed substances). These complexation energies ($\Delta E^{steric}$ and $\Delta E^{electrostatic}$) can be calculated for a specific derivative, cavity size and ligand. Hence, inclusion complexation is predictable to some extent. For example, the inventors found out that acetylated $\alpha$-cyclodextrin, $\beta$-cyclodextrin and acetylated $\gamma$-cyclodextrin are very effective cyclodextrin derivatives for improving the barrier properties of the inventive sealing element or polymer liner compound.

The compatible cyclodextrin derivative according to the present invention is a compound substantially free of an inclusion complex. For this invention, the term "substantially free of an inclusion complex" means that the quantity of the dispersed cyclodextrin material in the bulk polymer contains a large fraction having cyclodextrin free of a polymer contaminant, a permeant or other inclusion compound in the interior of the cyclodextrin molecule. A cyclodextrin compound is typically added and blended in the bulk polymer without any inclusion compound but some complexing can occur during manufacture. Such complexing can occur as polymer impurities and degradation materials become the inclusion compound in a cyclodextrin inclusion complex.

In principle, the preferred cyclodextrin derivative can contain one substituent on the single primary carbon hydroxyl and one substituent on one or both of the secondary carbon hydroxyls. Because of the geometry of the cyclodextrin molecule, and the chemistry of the ring substituents, the hydroxyl groups are not equal in reactivity. However, with care and effective reaction conditions, the cyclodextrin molecule can be reacted to obtain a derivatized molecule having a certain number of hydroxyl groups derivatized with a single substituent type. Further directed synthesis of a derivatized molecule with two different substituents or three different substituents is also possible. These substituents can be placed at random or directed to a specific hydroxyl. For the purposes of this invention, a broad range of pendant substituent moieties can be used on the molecule. These derivatized cyclodextrin molecules can include alkyl ether, silyl ether, alkyl ester, including cyclodextrin esters such as tosylates, mesylate and other related sulfo derivatives, hydrocarbyl-amino cyclodextrin, alkyl phosphono and alkyl phosphato cyclodextrin, imidazoyl substituted cyclodextrin, pyridine substituted cyclodextrin, hydrocarbyl sulphur containing functional group cyclodextrin, silicon-containing functional group substituted cyclodextrin, carbonate and carbonate substituted cyclodextrin, carboxylic acid and related substituted cyclodextrin and others.

Acyl groups that can be used as compatibilizing functional groups include acetyl, propionyl, butyryl, trifluoroacetyl, benzoyl and acryloyl groups. The formation of such groups on the hydroxyls of the cyclodextrin molecule involve well known reactions. The acylation reaction can be conducted using the appropriate acid anhydride, acid chloride, and well known synthetic protocols.

Cyclodextrin materials can also be reacted with alkylating agents to produced an alkylated cyclodextrin. Typical examples of alkyl groups useful in forming the alkylated cyclodextrin include methyl, propyl, benzyl, isopropyl, tertiary butyl, allyl, trityl, alkyl-benzyl and other common alkyl groups. Such alkyl groups can be made using conventional preparatory methods, such as reacting the hydroxyl group under appropriate conditions with an alkyl halide, or with an alkylating alkyl sulfate reactant.

Tosyl(4-methylbenzene sulfonyl), mesyl (methane sulfonyl) or other related alkyl or aryl sulfonyl forming reagents can also be used in manufacturing compatibilized cyclodextrin molecules.

Sulfonyl containing functional groups can be used to derivatize either of the secondary hydroxyl groups or the primary hydroxyl group of any the glucose moieties in the cyclodextrin molecule. The reactions can be conducted using a sulfonyl chloride reactant that can effectively react with either primary and secondary hydroxyl. The sulfonyl chloride is used at appropriate mole ratios depending on the number of target hydroxyl groups in the molecule requiring substitution. Sulfonyl groups can be combined with acyl or alkyl groups.

The sulfonyl derivatized cyclodextrin molecule can be used to generate the amino derivative from the sulfonyl group substituted cyclodextrin molecule via nucleophilic displacement of the sulfonate group by an azide-ion. The azido derivatives are subsequently converted into substituted amino compounds by reduction. Large numbers of these azido or amino cyclodextrin derivatives have been manufactured.

Examples of nitrogen containing groups that can be useful in the invention include acetylamino groups (—NHAc), alkylamino including methylamino, ethylamino, butylamino, isobutylamino, isopropylamino, hexylamino, and other alkylamino substituents. The amino or alkylamino substituents can further be reactive with other compounds that react with the nitrogen atom to further derivatize the amine group.

The cyclodextrin molecule also can be substituted with heterocyclic nuclei including pendent imidazole groups, histidine, imidazole groups, pyridino and substituted pyridino groups.

Cyclodextrin derivatives can be modified with sulfur containing functional groups to introduce compatibilizing substituents onto the cyclodextrin. Apart from the sulfonyl acylating groups mentioned above, sulfur containing groups manufactured based on sulfhydryl chemistry can be used to derivatize cyclodextrin. Such sulfur containing groups include methylthio (—SMe), propylthio (—SPr), t-butylthio (—S—C(CH$_3$)$_3$), hydroxyethylthio (—S—CH$_2$CH$_2$OH), imidazolylmethylthio, phenylthio, substituted phenylthio, aminoalkylthio and others. Based on the ether or thioether chemistry set forth above, cyclodextrin having substituents ending with a hydroxyl aldehyde ketone or carboxylic acid functionality can be prepared. Cyclodextrin with derivatives formed using silicone chemistry can contain compatibilizing functional groups.

Cyclodextrin derivatives with functional groups containing silicone herein called silicon ether can be prepared. Silicone groups generally refer to groups with a single substituted silicon atom or a repeating silicone-oxygen backbone with substituent groups. Typically, a significantly proportion of silicone atoms in the silicone substituent bear hydrocarbyl (alkyl or aryl) substituents. Silicone substituted materials generally have increased thermal and oxidative stability and chemical inertness. Further, the silicone groups increase resistance to weathering, add dielectric strength and improve surface tension. The molecular structure of the silicone group can be varied because the silicone group can have a single silicon atom or two to twenty silicon atoms in the silicone moiety, can be linear or branched, have a large number of repeating silicone-oxygen groups and can be further substituted with a variety of functional groups. For the purposes of this invention the simple silicone containing substituent moieties are preferred including trimethylsilyl, mixed methylphenyl silyl groups, etc.

In preferred embodiments of the present invention the cyclodextrin material comprises substituents having a silyl ether group, an alkyl ether group and/or an alkyl ester group. According to the present invention the alkyl ester substituents preferably comprise acetyl moieties, propyl moieties and/or butyl moieties, the alkyl ether substituents preferably comprise methyl moieties, ethyl moieties and/or propyl moieties and the silyl ether substituents preferably comprise methyl moieties, ethyl moieties, propyl moieties and/or butyl moieties.

It has been found by the inventors of the present invention that residual contaminants contained in sealing element and closure liner materials, referred to as migrants, can be complexed by cyclodextrins during the compounding phase of manufacturing. The importance of complexing mobile substances that originate within the closure structure is to prevent their migration from the closure structure to the content of the container, e.g. the beverage. Sealing element and closure liner migrant reduction can be achieved by dispersing active cyclodextrin compounds and preferably cyclodextrin compounds with a moisture content less than 2,000 ppm in the sealing and liner materials during the compounding phase of manufacturing. After compounding, the composition retains a residue comprising cyclodextrin complexes and active cyclodextrins without complexes. Residual volatile reduction occurs during compounding when cyclodextrins complex migrants that are inherent in polymer materials or are produced by thermooxidation, photodegradation and photooxidation of the polymer materials, processing aids, etc. and subsequently reside in the closure structure. A new non-volatile, complex with the migrants is formed via the cyclodextrin thereby preventing their release and sensory detection.

The moisture content in the cyclodextrin should be less than 5,000 ppm by weight. Cyclodextrin containing very high moisture levels will not readily form complexes with plastic oxidation products or other resin impurities during the extrusion-processing phase. However, moisture does not affect the complex formation in the sealing element.

Polymers used in this invention can also contain other additives, which do not adversely affect the performance of the cyclodextrin, such as catalysts, stabilizers, processing aids, fillers, pigments, dyes and antioxidants.

Commercially available equipment, used in the manufacture of sealing elements, especially polymer liner compound may be used to make sealing elements or polymer liner compounds according to the present invention.

The inventive composition comprising at least one thermoplastic polymer and a cyclodextrin material is created by physically mixing and dispersing the minor constituent, preferably a modified cyclodextrin, into the major constituent, the polymer, e.g. by extrusion. Suitable extrusion techniques include the so-called "direct incorporation" and "masterbatch addition". In either method it is preferred to use twin-screw co-rotating segmented barrel extruders. Of course it is also possible to use counter rotating or single screw extruders for mixing or dispersing the cyclodextrin material into the polymeric material. It is clear that the modified cyclodextrin can be added individually or in combination with other suitable additives or adjuvants. After mixing or dispersing the cyclodextrin material into the polymeric material the resulting molten plastic is e.g. pumped out of the extruder and pelletized.

There are several methods for incorporating modified cyclodextrin into polymer liner compounds comprising a heterogeneous blend of butyl rubber and a thermoplastic polymer, especially HDPE. For example, it has been found, that a cyclodextrin-containing heterogeneous blend can be obtained by feeding a masterbatch of modified cyclodextrin and e.g. the HDPE resin into the feed section of an extruder containing the other liner material, which preferably is butyl rubber. The masterbatch can e.g. be prepared by using the direct incorporation method mentioned above. The ratio of the HDPE resin to butyl rubber in the resulting liner is easily adjustable by using the aforementioned process.

The production of the closure element with liner or sealant usually uses the so-called "in-shell" molding technique. According to said known process the granules of the compound are fed into an extruder which melts and pumps the molten product to an orifice. External of this orifice is a rotating blade which cuts the extrudate into a pellet. In in-shell molding each of these pellets, which each weigh approximately 180 to 200 mg, is individually flipped or placed onto the inner surface of a crown cork, an aluminium or a plastic closure which forms the body of a screw cap. The still plastic polymer compound is spread over this inner surface or centre panel by a die punch and stamped to form a thin, approximately disc-like molding. At the same time, it is possible to form any annular projections of the molding which may be desired, which embrace the bottle rim in the mouth region when the cap is fitted.

In out-shell molding, the pellet is formed outside of the closure, on a "puck", and is then placed in the closure and molded into its final shape.

For some specific applications as for example the sealing of beer bottles, it is preferred to provide the cyclodextrin-containing polymer liner compound with one or more additional layers comprising a thermoplastic polymer and a compatible derivatized cyclodextrin dispersed in the thermoplastic polymer. As mentioned above, the additional layer preferably is arranged on the inner side of the liner, preferably having a diameter which is smaller than the diameter of the polymer liner compound comprising the heterogeneous blend, so that the additional layer material contacts the inner side of the neck of the bottle.

A laminated sealing element or polymer liner compound can be made by any conventional method. An additional liner layer e.g. can be supplied by injection molding on the heterogenous blend-liner (additional barrier polymer inside of the cap). Such a multi-step formation can also be done on a single machine having the appropriate internal working components for such injection molding operations.

According to the present invention it is also contemplated to apply coating compositions containing a thermoplastic polymer and an inventive cyclodextrin derivative in order to improve the barrier properties of the coated liner. Coating machines commonly apply a liquid composition containing a film forming material, additives that can help form and maintain the coating composition along with the effective amount of the cyclodextrin material.

The foregoing discussion illustrates various embodiments of the application and barrier properties of sealing compounds and closure liners of the invention. The following examples and data further exemplify the invention.

Figure 1:
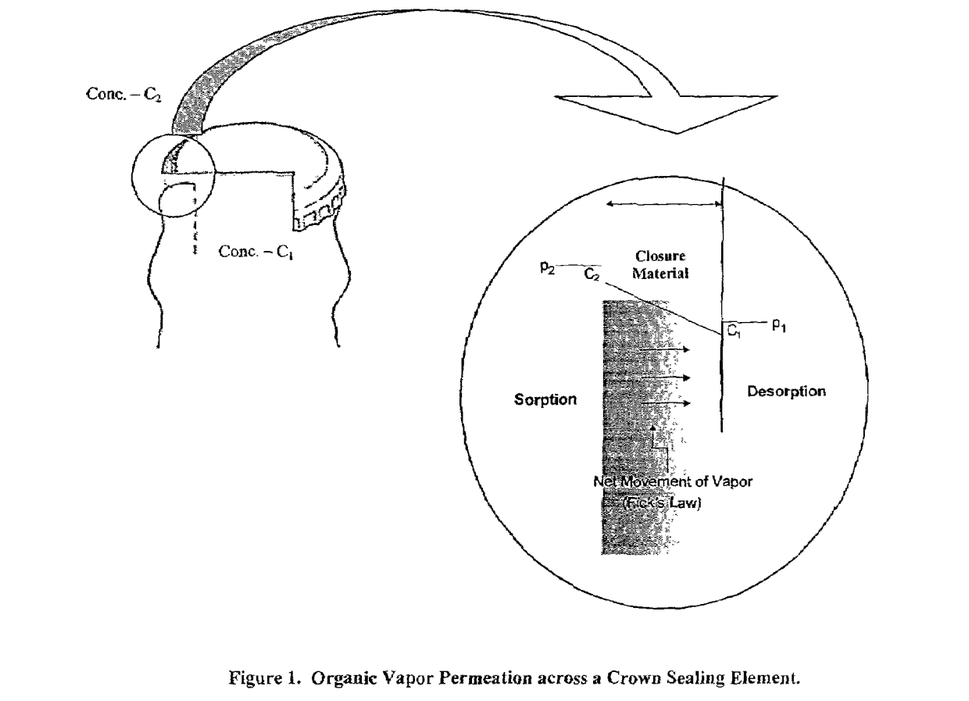
FIG. 1 shows a capped bottle where the organic permeant concentration ($C_2$) outside the bottle is greater than the concentration ($C_1$) inside the bottle.

The illustration in FIG. 1 pictorially shows a capped bottle where the organic permeant concentration ($c_2$) outside the bottle is greater than the concentration ($c_1$) inside the bottle.

When this case exists, the permeant(s) outside impact the liner material, sorb or dissolve into the liner material and then diffuse under a concentration gradient through the liner material or sealing element and finally release from the liner surface inside the bottle. The driving force for permeation is given as a partial pressure ($p_2$ to $p_1$) difference of the permeant(s) across the sealing portion of the liner.

The permeant concentration gradient shown above can be simulated experimentally in the laboratory making it possible to measure barrier improvement of cyclodextrin-containing sealing compounds and closure elements.

The following procedures were used to measure improved sealing material barrier to organoleptic permeants, such as, aliphatic aldehydes, unsaturated aldehydes and ketones and trichloroanisole.

Test Methods

Permeation across a barrier can be explained where the membrane at time zero ($t_0$) is initially free from permeant vapor. The penetrant pressure $p_2$ at the upstream face of the membrane is increased giving a concentration in the surface layer $c_2$ (see FIG. 2). Diffusion is a measure of how quickly permeants move in a membrane across the concentration gradient and the time it takes to reach steady state. The downstream pressure, $p_1$, while measurable, is negligible at small times relative to the upstream pressure $p_2$. The amount of vapor permeating the thermoplastic barrier increases linearly with time once steady state has been reached. At large times, the upstream pressure $p_2$ will equal the downstream pressure $p_1$.

Figure 2:
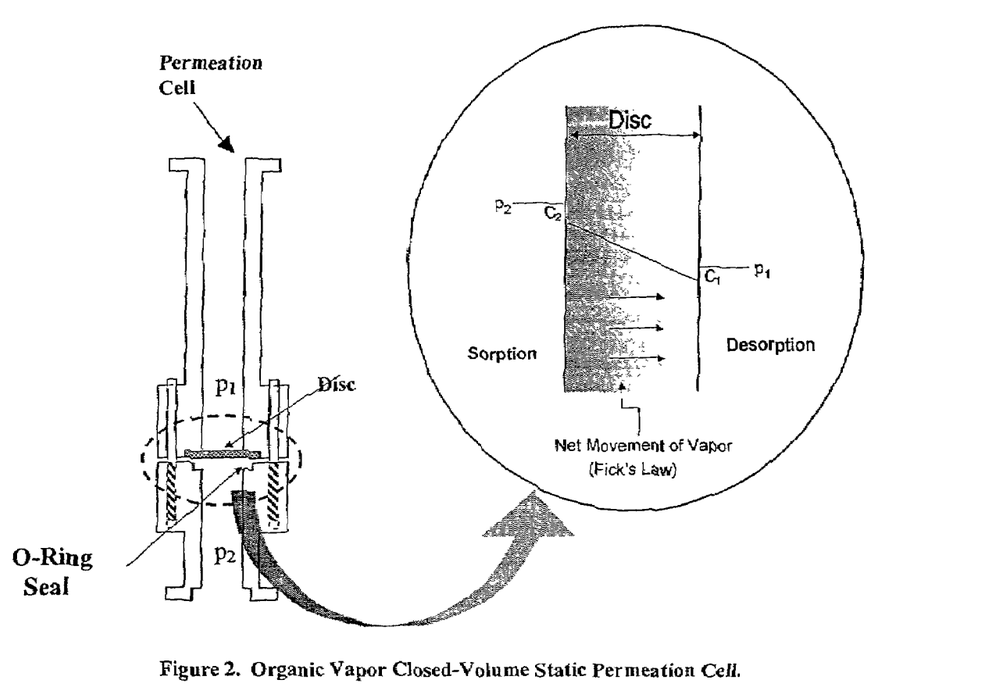
FIG. 2 shows an organic vapor closed-volume static permeation cell.

The permeation test method used to evaluate organic barrier involves experimental techniques to measure organic molecule transport through a liner material test disc, using a static concentration gradient. The schematic assembly of the permeation cell is shown in FIG. 2.

A monolayer disc of the liner material and various organic test permeants were used to evaluate barrier performance. High-resolution gas chromatography was used to qualitatively and quantitatively measure the cumulative downstream penetrant concentration $p_1$ at a specified time. The invention shows cyclodextrin dispersed into a liner material then formed into a disc reduces organic vapor transport, compared to the same material without cyclodextrin, both measured in static test cells (FIG. 2) and quantitated as a reduction in mass flux.

Figure 3:
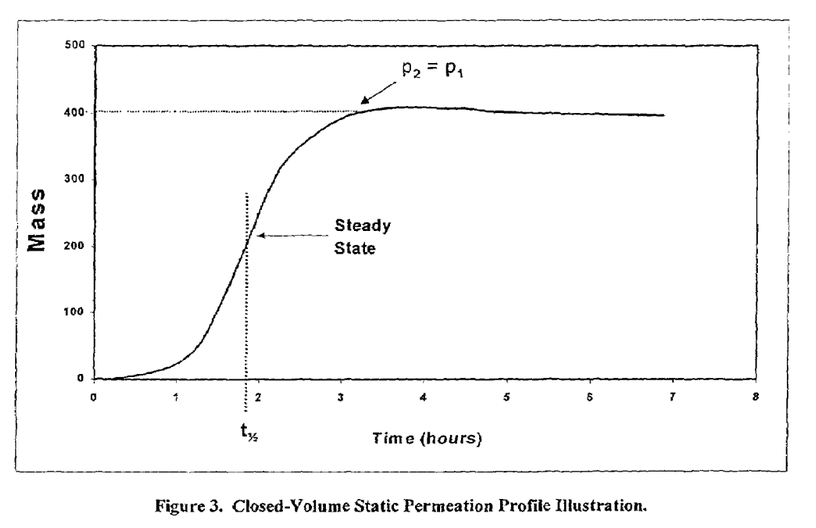
FIG. 3 illustrates a closed-volume static permeation profile.

Monolayer discs and test permeants (i.e., aldehydes and ketones) were initially evaluated to create a permeation profile. The time when $p_2 = p_1$ is determined for each liner material. The midpoint of the steady state profile or time $t_{1/2}$ is established for each liner material without cyclodextrin. An example closed-volume static permeation profile illustrating $p_2 = p_1$ and $t_{1/2}$ is provided in FIG. 3. Three liner materials (Svelon® 855 a sealing compound for crown corks, Polyliner® 461-3 a sealing compound for plastic closures and Oxylon® CS25 a high-barrier sealing compound for crown corks), all manufactured by DS-Chemie, Bremen, Germany, were prepared and tested by the following preparation and analytical methods. Table 1 provides time $t_{1/2}$ for each test liner material.

TABLE 1

Time $t_{1/2}$ as Measured by Static Permeation - Permeation Cell Temperature Maintained at 50° C.

| Closure Material | Time $t_{1/2}$ (in Hours) |
|---|---|
| Svelon 855 | 6 |
| Polyliner 461-3 | 6 |
| Oxylon CS25 | 16 |

Test Sample Preparation

Liner materials were compounded with triacetyl gamma cyclodextrin (TA-γ-CD) using a laboratory scale batch mixer. Triacetyl gamma cyclodextrin was dry blend mixed with the resin prior to compounding on a weight to weight basis of 0.30% and 0.4% triacetyl gamma cyclodextrin. The triacetyl gamma cyclodextrin was manufactured by Wacker Biochem Corporation, Adrian. Mich.

A Brabender fusion bowl or batch mixer was used to compound the liner materials. The fusion bowl consists of two counter rotating roller blades in a number eight-shaped bowl. Control liner material (no CD) and liner material+CD material was run using the procedure described below.

The fusion bowl temperature was set at 125° C. With the rpm of the blades set at 60, 40 grams of resin was dropped into the bowl. All the material is fed into the bowl over a 30-second period. After another 6.5 minutes of processing, the screw speed was reduced to zero and the molten resin is removed and collected on aluminum foil. The bowl and the roller blades were thoroughly cleaned before starting the next run.

Liner Material Disc Preparation. Several grams of compounded liner material were placed into an Atlas lab-mixing molder. The mold was heated to 175° C., the resin mixed to a molten state, and then the resin was injected into the heated (85° C.) mold. The dimensions of the mold cavity are 1.75-cm×4.45-cm×0.10-cm thick. A 1.27-cm diameter punch is used to cut two discs from the molded part for static permeation testing.

Analytical Method

Organic Vapor Permeation. The permeation method involves experimental techniques to measure organic molecule transport through a polymer packaging structure, using a static concentration gradient. High-resolution gas chromatography (HRGC) operated with a flame ionization detector (FID) or with electron capture detection (ECD) is used to measure the cumulative downstream penetrant concentration at time $t_{1/2}$.

Apparatus. Disc samples (~1,000 μm thick×1.27 cm diameter and weighing approximately 125 mg) were tested in a closed-volume vapor permeation device (refer to FIG. 2). The experimental aluminum measurement cell has two compartments (i.e., cells) separated by a molded disc of liner material under study (effective disc area=1.3 cm²) and capped at both ends using Teflon® faced butyl rubber septa and aluminum crimp-tops.

The test disc is placed into the upper cell; the cell is assembled using an o-ring to firmly seal the test disc and screws to pull upper and lower cells together. Next, the upper cell is capped with a Teflon® faced butyl rubber septa and aluminum crimp-top. Two permeation standards are prepared. The first permeant standard contains octanal, nonanal, trans-2-nonenal and 1-octen-3-one, and the second permeation standard contains 2,4,6-trichloroanisole. All of the permeants are dispersed in a deionized water/surfactant mixture. The permeant water/surfactant mixture is injected into the lower cell providing a concentration $p_2$ at $t_0$ shown in Tables 2 to 6. Individual permeant concentrations $p_2$ in the lower cell are expressed in parts per million μL/L (vol./vol.) using gas law conversion. Then the lower cell is immediately capped with Teflon® faced butyl rubber septa and aluminum crimp-top.

Test Results

Aldehydes and Ketone. This method involves experimental techniques designed to simultaneously measure the flux of co-permeants across the liner material test disc. The test methodology simulates accelerated shelf-life testing conditions by using an elevated cell storage temperature of 50° C.

HRGC operated with a FID was used to measure the change in the cumulative penetrant concentration at time $t_{1/2}$ in the upstream cell. At time $t_{1/2}$, a sample was collected by solid phase microextraction (SPME) from the upper cell and analyzed by HRGC/FID. Individual permeant concentrations were determined from calibration standards and measured in nL/L or parts per billion (vol./vol.) using gas laws.

TABLE 2

Concentration of Co-Permeants Measured by Static Permeation using Headspace HRGC/FID in a Control Svelon ® Disc and Svelon ® Discs with 0.30% and 0.40% Triacetyl gamma Cyclodextrin - Permeation Cell Temperature maintained at 50° C.

| Permeant | Conc. $p_2$ at Time = 0 All Samples μL/L | Concentration - $p_1$ at Time = 6 Hours | | |
|---|---|---|---|---|
| | | Control nL/L | 0.30% TA-γ-CD nL/L | 0.40% TA-γ-CD nL/L |
| Octanal | 98 | 53 | 36 | 16 |
| Nonanal | 91 | 9.9 | 6.2 | 2.2 |
| trans-2-Nonenal | 89 | 7.2 | 5.6 | 3.3 |
| 1-Octen-3-one | 103 | 35 | 28 | 12 |
| Total | 381 | 105 | 76 | 34 |

μL/L = Parts Per Million
nL/L = Parts Per Billion

TABLE 3

Concentration of Co-Permeants Measured by Static Permeation using Headspace HRGC/FID in a Control Polyliner ® Disc and Polyliner ® Discs with 0.40% Triacetyl gamma Cyclodextrin - Permeation Cell Temperature maintained at 50° C.

| Permeant | Conc. $p_2$ at Time = 0 All Samples μL/L | Concentration - $p_1$ at Time = 6 Hours | |
|---|---|---|---|
| | | Control nL/L | 0.40% TA-γ-CD nL/L |
| Octanal | 98 | 370 | 360 |
| Nonanal | 91 | 43 | 30 |
| trans-2-Nonenal | 89 | 29 | 21 |
| 1-Octen-3-one | 103 | 92 | 83 |
| Total | 381 | 534 | 494 |

μL/L = Parts Per Million
nL/L = Parts Per Billion

Test cells were prepared and analyzed in triplicate. Tables 2 and 3 contain four permeants, the concentration $p_2$ of each of the permeants in the lower cell at t=0, and the concentration $p_1$ of each of the permeants in the upper cell at time $t_{1/2}$ or 6-hours in the control and the triacetyl gamma cyclodextrin (TA-γ-CD) samples.

Trichloroanisole. HRGC operated with an ECD was used to measure the change in the cumulative trichloroanisole concentration at time $t_{1/2}$ in the upstream cell. At time $t_{1/2}$, a sample was collected by solid phase microextraction (SPME) from the upper cell and analyzed by HRGC/ECD. The trichloroanisole concentration is determined from calibration standards and measured in pL/L or parts per trillion (vol./vol.) using gas laws. Test cells are prepared and analyzed in triplicate. Table 4 to 6 contain the concentration $p_2$ of TCA in the lower cell at t=0, and the concentration $p_1$ of TCA in the upper cell at time $t_{1/2}$ in the control and the triacetyl gamma cyclodextrin (TA-γ-CD) samples.

TABLE 4

Concentration of Trichloroanisole Measured by Static Permeation using Headspace HRGC/ECD in a Control Svelon ® Disc and Svelon ® Discs with 0.40% Triacetyl gamma Cyclodextrin - Permeation Cell Temperature maintained at 50° C.

| Permeant | Conc. $p_2$ at Time = 0 All Samples μL/L | Concentration - $p_1$ at Time = 6 Hours | | |
|---|---|---|---|---|
| | | Control pL/L | 0.30% TA-γ-CD pL/L | 0.40% TA-γ-CD pL/L |
| 2,4,6-Trichloroanisole | 0.925 | 548 | 503 | 418 |
| Total | 0.925 | 548 | 503 | 418 |

μL/L = Parts Per Million
pL/L = Parts Per Trillion

TABLE 5

Concentration of Trichloroanisole Measured by Static Permeation using Headspace HRGC/ECD in a Control Polyliner ® Disc and Polyliner ® Discs with 0.40% Triacetyl gamma Cyclodextrin - Permeation Cell Temperature maintained at 50° C.

| Permeant | Conc. $p_2$ at Time = 0 All Samples μL/L | Concentration - $p_1$ at Time = 6 Hours | |
|---|---|---|---|
| | | Control pL/L | 0.40% TA-γ-CD pL/L |
| 2,4,6-Trichloroanisole | 0.925 | 9,100 | 5,700 |
| Total | 0.925 | 9,100 | 5,700 |

μL/L = Parts Per Million
pL/L = Parts Per Trillion

TABLE 6

Concentration of Trichloroanisole Measured by Static Permeation using Headspace HRGC/ECD in a Control Oxylon ® Disc and Oxylon ® Discs with 0.40% Triacetyl gamma Cyclodextrin - Permeation Cell Temperature maintained at 50° C.

| Permeant | Conc. $p_2$ at Time = 0 All Samples μL/L | Concentration - $p_1$ at Time = 16 Hours | |
|---|---|---|---|
| | | Control pL/L | 0.30% TA-γ-CD pL/L |
| 2,4,6-Trichloroanisole | 0.925 | 920 | 620 |
| Total | 0.925 | 920 | 620 |

μL/L = Parts Per Million
pL/L = Parts Per Trillion

Test cells were prepared and analyzed in triplicate. Tables 4 and 6 contain 2,4,6-trichloroanisole permeant, the concentration $p_2$ of each of the permeants in the lower cell at t=0, and the concentration $p_1$ of each of the permeants in the upper cell at time $t_{1/2}$ (6-hours for Svelon and Polyliner, and 16-hours for Oxylon) in the controls and the triacetyl gamma cyclodextrin (TA-γ-CD) samples.

The data in Tables 2 to 6 show a low loading of cyclodextrin material having compatible pendant groups can provide excellent mass flux reduction in sealing compounds and liner materials. These data show that the sealing elements or liners according to the present invention provide excellent barrier properties and organic permeants reductions.

The following procedures were used to measure the reduction or complexation of residual volatiles in liner materials.

Test Sample Preparation

Svelon® 855 was compounded with triacetyl beta cyclodextrin using a laboratory scale batch mixer. Triacetyl beta cyclodextrin (moisture content<2,000 ppm by weight) was dry blend mixed with the resin prior to compounding on a weight to weight basis of 0.40% triacetyl beta cyclodextrin. The cyclodextrin is dried at 105° C. for a minimum of 6 hours at 1" Hg vacuum.

A Brabender fusion bowl or batch mixer was used to compound the Svelon® 855+CD. The fusion bowl consists of two counter rotating roller blades in a number eight-shaped bowl. A control Svelon® 855 (no CD) and the Svelon® 855+CD material was run using the procedure described below.

The fusion bowl temperature was set at 125° C. With the rpm of the blades set at 60, 40 grams of resin is dropped into the bowl. All the material is fed into the bowl over a 30-second period. After another 6.5 minutes of processing, the screw speed is reduced to zero and the molten resin is removed and collected on aluminum foil. The bowl and the roller blades are thoroughly cleaned before starting the next run. Compounded Svelon® 855 material is milled into shavings having ~20 μm thickness for residual resin volatiles testing.

Analytical Method

Residual Resin Volatiles. Volatile compounds in the Svelon® 855 samples out-gas into the vial's headspace during confinement. These volatiles are then purged from the vial's headspace and the individual components subsequently identified and quantitated by dynamic headspace high-resolution gas chromatography/mass spectrometry (DH HRGC/MS). Seventy-six (76) specific compounds quantitated in the DH HRGC/MS method are combined into ten broad chemical families (i.e., aliphatic alcohols, aliphatic aldehydes, aromatic aldehydes, unsaturated aldehydes, saturated ketones, alpha unsaturated ketones, aromatics, alkanes, alkenes and acetates) typically associated with off-odor/flavor compounds.

A 2.00+/−0.02 g sample is placed into a 22-ml glass headspace vial. The vial is capped using a Teflon faced septa and aluminum crimp-top. Residual resin volatiles are desorbed from the sample into the headspace by heating the vial at 85° C. for 24-hours. At the end of the time interval, the sample is removed from the controlled environment to a purge and trap sampler interfaced via a jet separator to the mass spectrometer. Mass spectra from the sample total ion chromatograms are searched against an in-house reference spectra file of the seventy-six compounds. Quantitation is carried out with two internal standards and two surrogate standards, all added prior to sample purge. The analytical results (compounds are expressed in nanograms per gram of resin or parts per billion) are provided in Table 7.

Test Results

When a commercial closure liner material (Svelon® 855) is analyzed by gas chromatography for mobile migrant contaminants, it is shown to contain a very complex mixture of volatiles. Over fifty individual compounds are detected chromatographically. These residual volatile materials are principally branched alkanes, alkenes and cycloalkanes to a smaller number of organoleptic compounds such as saturated and unsaturated aldehydes and substituted aromatic compounds.

The largest chemical families represent by Svelon® 855 residual volatiles are aromatic (ten individual compounds) and alkanes (three individual compounds). Saturated and unsaturated aldehydes and the saturated ketone families contained only a single compounds each. In all, sixteen of the seventy-six compounds were identified above the estimated quantitation level of the method—generally low parts per billion for most of the listed compounds.

The organoleptic compounds of most interest in Table 7 are the aldehydes (acetaldehyde and acrolein) and to a lesser extent styrene and alpha methylstyrene. Acetaldehyde is the one of the larger analytes in the Svelon® 855 and generally associated with off-flavor in bland beverages such as mineral water. Further acetaldehyde is a very mobile contaminant in the resin. The aromatic and alkane family compounds have significantly less odor and taste impact. The compound(s) and their off-odor/flavor impact is dependent on the specific beverage or container content.

Triacetyl beta cyclodextrin (TA-β-CD) shows the best reduction of Svelon® 855 residual resin volatiles. Using DH HRGC/MS (Dynamic Headspace High-Resolution Gas Chromatography/Mass Spectrometry) to measure residual volatiles, the total volatile compounds (all sixteen compounds detected in the 76 compound list) reduction is 38% for an admix of 0.4% TA-β-CD.

Specific organoleptic compounds (e.g., acetaldehyde and acrolein) present in large amounts were greatly reduced by TA-β-CD. Acetaldehyde and acrolein were reduced by 45% and 69% respectively. Styrene and alpha methylstyrene were reduced 31% and 30% respectively. Acetone, not considered an organoleptic compound, was reduced by 46%. The more difficult resin volatiles to reduce are in the aromatic and alkane families; smaller reductions of 29% and 21% were achieved for the combined compounds in the aromatic and alkane families, respectively.

TABLE 7

Dynamic Headspace High-Resolution Gas Chromatography/Mass Spectrometry of Compounded Svelon ® 855 Control and Svelon ® 855 with 0.40% TA-β-CD.

| Sample ID:<br>Analyte | EQL<br>ng/g | Control<br>ng/g | 0.4% TA-β-CD<br>ng/g |
|---|---|---|---|
| Aliphatic alcohols |  | ND | ND |
| Isopropanol | 10 | ND | ND |
| 2-Heptanol | 300 | ND | ND |
| 2-Ethyl-1-hexanol | 75 | ND | ND |
| 1-Octanol | 50 | ND | ND |
| 1-Nonanol | 100 | ND | ND |
| Aliphatic aldehydes |  | 550 | 300 |
| Acetaldehyde | 100 | 550 | 300 |
| Propanal | 10 | ND | ND |
| Isobutyraldehyde | 15 | ND | ND |
| Butanal | 10 | ND | ND |
| Isovaleraldehyde | 25 | ND | ND |
| 2-Methylbutanal | 15 | ND | ND |
| Pentanal | 10 | ND | ND |
| Hexanal | 15 | ND | ND |
| Heptanal | 25 | ND | ND |
| Octanal | 15 | ND | ND |
| Nonanal | 150 | ND | ND |
| Aromatic aldehydes |  | ND | ND |

TABLE 7-continued

Dynamic Headspace High-Resolution Gas Chromatography/Mass Spectrometry of Compounded Svelon ® 855 Control and Svelon ® 855 with 0.40% TA-β-CD.

| Sample ID: Analyte | EQL ng/g | Control ng/g | 0.4% TA-β-CD ng/g |
|---|---|---|---|
| Benzaldehyde | 10 | ND | ND |
| Phenylacetaldehyde | 100 | ND | ND |
| Unsaturated aldehydes | | 200 | 61 |
| Acrolein | 25 | 200 | 61 |
| tr-2-Butenal | 25 | ND | ND |
| tr-2-Pentenal | 50 | ND | ND |
| tr-2-Hexenal | 50 | ND | ND |
| tr-2-Heptenal | 25 | ND | ND |
| tr-2,cis-6-Nonadienal | 25 | ND | ND |
| tr-2-Nonenal | 300 | ND | ND |
| tr-2,tr-4-Nonadienal | 100 | ND | ND |
| tr-2,tr-4-Decadienal | 50 | ND | ND |
| Aliphatic ketones | | 480 | 260 |
| Acetone | 10 | 480 | 260 |
| 2,3-Butanedione | 10 | ND | ND |
| 2-Butanone | 10 | ND | ND |
| 4-Methyl-2-pentanone | 10 | ND | ND |
| 3-Hexanone | 15 | ND | ND |
| 2-Hexanone | 25 | ND | ND |
| 3-Heptanone | 25 | ND | ND |
| 2-Heptanone | 50 | ND | ND |
| Unsaturated ketones | | ND | ND |
| 1-Hepten-3-one | 10 | ND | ND |
| 1-Octen-3-one | 20 | ND | ND |
| 1-Nonen-3-one | 100 | ND | ND |
| Aromatics | | 1.206 | 854 |
| Benzene | 10 | ND | ND |
| Toluene | 10 | 10 | 5 |
| Ethylbenzene | 15 | 65 | 48 |
| m,p-Xylene | 10 | 24 | 15 |
| Styrene | 25 | 320 | 220 |
| o-Xylene | 15 | 33 | 25 |
| Isopropylbenzene | 25 | 130 | 96 |
| n-Propylbenzene | 10 | 81 | 63 |
| 1,3,5-Trimethylbenzene | 15 | 63 | 48 |
| a-Methylstyrene | 10 | 460 | 320 |
| tert-Butylbenzene | 15 | ND | ND |
| 1,2,4-Trimethylbenzene | 15 | ND | ND |
| sec-Butylbenzene | 25 | 20 | 14 |
| 4-Isopropylbenzene | 15 | ND | ND |
| n-Butylbenzene | 25 | ND | ND |
| Alkanes | | 216 | 170 |
| Hexane | 15 | 98 | 93 |
| 2,2-Dimethylhexane | 10 | ND | ND |
| Octane | 15 | 24 | 12 |
| Decane | 10 | 94 | 65 |
| Dodecane | 150 | ND | ND |
| Tetradecane | 300 | ND | ND |
| Alkenes | | ND | ND |
| 1-Hexene | 10 | ND | ND |
| tr-2-Hexene | 10 | ND | ND |
| 1-Octene | 10 | ND | ND |
| Myrcene | 10 | ND | ND |
| 1-Decene | 25 | ND | ND |
| 1-Dodecene | 10 | ND | ND |
| 1-Tetradecene | 200 | ND | ND |
| Acetates | | ND | ND |
| Methyl acetate | 10 | ND | ND |
| Vinyl acetate | 15 | ND | ND |
| Ethyl acetate | 15 | ND | ND |
| Isopropyl acetate | 15 | ND | ND |
| Allyl acetate | 15 | ND | ND |
| n-Propyl acetate | 25 | ND | ND |
| Ethyl butyrate | 25 | ND | ND |
| n-Butyl acetate | 10 | ND | ND |
| n-Pentyl acetate | 10 | ND | ND |
| Isopentyl acetate | 50 | ND | ND |
| Total Hydrocarbons | | 2.652 | 1.645 |

EQL = Estimated Quantitation Limit
ND = Not Detected

The invention claimed is:

1. A closure for an aperture of a beverage bottle, comprising:

a cap having an inner side; the cap selected from the group consisting of a twist crown, a crown cork and a screw cap; and a sealing element situated on an inner side of the cap which, in use substantially faces the beverage bottle, the sealing element being tightly fitted onto the aperture by a pressure from the cap to seal the aperture, the sealing element including (a) an extrudable thermoplastic polymer and (b) an effective absorbing amount of an unmodified cyclodextrin material, wherein the unmodified cyclodextrin material is selected from the group consisting of α-cyclodextrin, β-cyclodextrin, γ-cyclodextrin, and mixtures thereof; and wherein the unmodified cyclodextrin material is dispersed in the thermoplastic polymer.

2. The closure of claim 1, wherein the thermoplastic polymer comprises a polyolefine.

3. The closure of claim 1, wherein the thermoplastic polymer comprises a high density polyethylene (HDPE).

4. The closure of claim 1, wherein the amount of unmodified cyclodextrin material in the sealing element is in the range between 0.01 and 5 wt-%, based on the weight of the thermoplastic polymer in the sealing element.

5. The closure of claim 1, wherein the amount of unmodified cyclodextrin material in the sealing element is in the range between 0.1 and 1 wt-%, based on the weight of the thermoplastic polymer in the sealing element.

6. The closure of claim 1, wherein the sealing element includes a heterogeneous blend of the thermoplastic polymer and a rubber component.

7. The closure of claim 1, wherein the sealing element includes a heterogeneous blend of the thermoplastic polymer and butyl rubber, wherein the thermoplastic polymer is a high-density polyethylene.

8. The closure of claim 1, wherein the sealing element includes a first layer and at least one additional layer containing the thermoplastic polymer and an effective absorbing amount of the unmodified cyclodextrin material.

9. The closure of claim 8, wherein the sealing element is situated on the inner side of the cap and wherein the at least one additional layer is arranged on the inner side of the cap, substantially facing the beverage bottle.

10. The closure of claim 8, wherein the at least one additional layer fits into the aperture of the beverage bottle and does not extend to an area clamped between an edge of the aperture and the closure.

11. The closure of claim 1, wherein the sealing element is a laminate.

12. The closure of claim 1, wherein the sealing element is extruded thermoplastic polymer containing the effective absorbing amount of a cyclodextrin material.

13. The closure of claim 1, wherein the thermoplastic polymer comprises one of a butyl rubber and a polypropylene.

* * * * *